United States Patent [19]
Miyamoto et al.

[11] Patent Number: 5,784,347
[45] Date of Patent: Jul. 21, 1998

[54] OPTICAL DISK DEVICE HAVING OPTICAL PHASE COMPENSATOR

[75] Inventors: Harukazu Miyamoto, Kodaira; Takeshi Shimano, Tokorozawa; Hisataka Sugiyama, Kodaira; Mariko Umeda, Tokyo, all of Japan

[73] Assignee: Hitachi, Ltd., Tokyo, Japan

[21] Appl. No.: 597,406

[22] Filed: Feb. 8, 1996

[30] Foreign Application Priority Data

Feb. 13, 1995 [JP] Japan ................ 7-023728
Feb. 13, 1995 [JP] Japan ................ 7-023729

[51] Int. Cl.⁶ ............................................ G11B 7/00
[52] U.S. Cl. ................... 369/54; 369/13; 369/110; 369/44.23
[58] Field of Search ............. 369/110, 13, 44.23, 369/44.14, 54, 48, 124

[56] References Cited

U.S. PATENT DOCUMENTS 4,773,053  9/1988  Gottfried ........................ 369/13
4,774,615  9/1988  Revelli et al. ................... 369/13
5,099,470  3/1992  Matsubayashi ................. 369/13

FOREIGN PATENT DOCUMENTS 0191156  10/1984  Japan.
0134839  6/1987  Japan ........................ 369/110
0076134  3/1990  Japan.
0083241  4/1991  Japan ........................ 369/110

Primary Examiner—Thang V. Tran
Attorney, Agent, or Firm—Antonelli, Terry, Stout, & Kraus, LLP

[57] ABSTRACT

An optical disk device having a light source for emitting light, focusing optics for radiating and focusing the light onto an optical recording medium, a photo-detection system for photoelectrically transforming reflected light from the optical recording medium, a reproduction circuit for reproducing information recorded on the optical recording medium by using an electric signal from the photo-detection system, phase control optics for changing the phase of the reflected light, a readout control circuit for controlling the quantity of the phase change of the phase control optics, and a learning control circuit for calculating the optimum value of the phase change quantity by monitoring the output signal of the reproduction circuit while changing the quantity of the phase change by the readout control circuit. Thus, information can be reproduced from a recording medium having high recording density without crosstalk.

17 Claims, 12 Drawing Sheets

OPTICAL DISK DEVICE HAVING OPTICAL PHASE COMPENSATOR

BACKGROUND OF THE INVENTION

The present invention relates to an optical recording/reproducing apparatus which is particularly suitable for a high-density magneto-optical recording/reproducing apparatus having a smaller track width than a spot of light.

The configuration of a conventional magneto-optical recording/reproducing apparatus is disclosed in Japanese Patent Application Un-examined Publication No. JP-A-59-191156. In this example, a laser beam emitted from a laser mounted on an optical head is focused by a lens via various optical systems so that a spot of light is formed on a magneto-optical recording medium. The position of the light spot on the magneto-optical recording medium is controlled by moving the optical systems. Reflected light from the magneto-optical recording medium is led to a photo-detector so as to be subjected to opto-electric transformation. A readout signal from the photo-detector is processed by a reproduction circuit so as to be transformed into readout data.

FIG. 8 shows an example of a conventional optical head. Laser light emitted from a laser 311 is linearly polarized and focused on a magneto-optical recording medium 8 via a mirror 322 and a lens 321. Light reflected from the magneto-optical recording medium 8 is subjected to Kerr rotation in accordance with information recorded on the medium, so that the polarization plane thereof rotates slightly by a small angle (about 1 degree). A photo-detector means 33 includes a half wave plate 337, a lens 331, a polarized beam splitter 332, and two photo-detectors 333 and 334. The polarization plane of the reproduced light is rotated by about 45 degrees by the half wave plate 337 and then split into two components by the beam splitter 332. As a result, the change of the plane of the reproducing light in the direction of polarization is detected on the basis of a difference signal indicating a difference between two kinds of light which reach the two photo-detectors 333 and 334 respectively to thereby generate an output signal, that is, a reproduction signal.

In the conventional case, however, there arises a problem that the polarization state of light which reaches a photo-detection portion changes to cause deterioration of the reproduction signal quality or increase of crosstalk (leaking of adjacent information) if the optical element of the optical head or the magneto-optical recording medium has optical anisotropy, optical rotary power, optical phase difference (retardation) or circular dichroism (Kerr ellipticity).

SUMMARY OF THE INVENTION

In order to solve the aforementioned problems, an object of the present invention is to provide a magneto-optical recording apparatus which can normally realize an optimum optical phase state regardless of the characteristic of the optical element of the optical head and regardless of the characteristic of the magneto-optical recording medium, and which can realize reproduction of high-density magneto-optical recording without crosstalk.

To achieve the foregoing object, the following means are used.

An optical disk device according to the present invention comprises: a light source for emitting light; focusing optics for radiating and focusing the light onto an optical recording medium; a photo-detection system for detecting reflected light of the light radiated by the focusing optics; a reproduction circuit for forming an information reproduction signal by using a signal from the photo-detection system; phase control optics for controlling an optical phase of the reflected light; and a readout control circuit for controlling a quantity of phase compensation of the phase control optics on the basis of the information reproduction signal.

By this configuration, the phase of the phase control optics can be feedback-controlled on the basis of the reproduction signal, so that an optimum optical phase state can be always achieved. The optical phase state used herein means, for example, phase difference which is created between light (P polarization) having the same polarization plane as reflected light of radiated light and light (S polarization) having a polarization plane perpendicular to the direction of polarization.

Further, the optical disk device may comprises: a light source for emitting light; focusing optics for radiating and focusing the light onto an optical recording medium; a photo-detection system for photo-electrically transforming reflected light from the optical recording medium; a reproduction circuit for reproducing information recorded on the optical recording medium by using an electric signal from the photo-detection system; phase control optics for changing a phase of the reflected light; a readout control circuit for controlling a quantity of an optical phase change of the phase control optics; and a learning control circuit for calculating an optimum value of the quantity of the optical phase change by monitoring an output signal of the reproduction circuit while changing the quantity of the optical phase change by the readout control circuit. Further, the optimum value may be stored so that the phase can be controlled in a manner of sampling-and-holding on the basis of the stored optimum value.

By this configuration, the optimum value of the phase can be calculated to control the phase of the phase control optics to the optimum value even in the case where it is difficult to real-time detect the optimum value of the phase to feed the optimum value back because of the difficulty of separation of the influence of phase error and the original reproduction signal. Accordingly, not only the range of application is widened but also maloperation is prevented to improve stability even in the case where the reproduction signal is weak. Accordingly, this means is effective particularly at the time of high-density recording.

For learning control, as the recording medium, it is preferable to use a recording medium having learning regions in which recording marks for learning are formed in advance.

Preferably, the quantity of the optical phase change of the phase control optics is changed when a different region on a magneto-optical recording medium is reproduced.

By this configuration, the best reproduction signal can be always obtained regardless of the variety in the medium and the difference of the form of the medium. Furthermore, for example, also in a land/groove recording method in which information is recorded both in grooves of the medium and on lands of the medium, reproduction can be performed in an optimum phase state both in the groove and on the land.

As the phase control optics, there may be used means which has a first quarter wave plate, a half wave plate and a second quarter wave plate in a light path of the reflected light in order with respect to the reflected light, and has a mechanism for rotating the half wave plate around an optical axis of the reflected light.

In this configuration, optical phase difference can be adjusted flexibly only by a simple rotation mechanism. The quarter wave plate used herein means a plate having a function of delaying the phase of light in the direction of polarization of the slow axis among phases of transmitted light for a quarter wavelength from the phase of light in the direction of polarization of the fast axis. Similarly, the half wave plate used herein means a plate having a function of delaying the phase of light in the direction of polarization of the slow axis among phases of transmitted light for a half wavelength from the phase of light in the direction of polarization of the fast axis.

As the phase control optics, there may be used means which has a first quarter wave plate and a second quarter wave plate in a light path of the reflected light in order with respect to the reflected light, and has a mechanism for rotating the first quarter wave plate, together with photo-detectors in the photo-detection system, around an optical axis of the reflected light.

In this configuration, not only the optical phase difference can be adjusted freely only by a simple rotation mechanism but also the number of parts can be reduced. Accordingly, a low-price magneto-optical recording/reproducing apparatus can be provided. As the rotation mechanism, there is used, for example, a voice coil or a stepping motor.

The high-speed axis or low-speed axis of the first quarter wave plate may be made substantially coincident with a direction of polarization of the reflected light.

By this configuration, phase difference in components of reflected light having an influence on magneto-optical reproduction signal components among phase differences can be compensated effectively.

As the phase control optics, preferably, there may be used means which has at least one high-order phase plate in a light path of the reflected light correspondingly to the reflected light, and has a mechanism for rotating the high-order phase plate around a low-speed axis or a high-speed axis.

In this configuration, not only optical phase difference can be adjusted freely by a simpler mechanism but also the number of parts can be reduced. Accordingly, a lower-price magneto-optical recording/reproducing apparatus can be provided. The high-order phase plate used herein means a plate in which phase difference of light between the direction of the slow axis and the direction of the fast axis is made larger than wavelength.

In the present invention, the phase of the phase control optics is feedback-controlled to optimize reproduction signal quality. Accordingly, an optimum optical phase state can be always achieved. In this occasion, such an optimum optical phase state can be achieved stably by performing reproduction while changing the quantity of phase control in learning regions of the magneto-optical recording medium, calculating the optimum quantity of phase control on the basis of the reproduction signal, storing the calculated optimum quantity of phase control and performing phase control on the basis of the optimum quantity of phase control at the time of practical data reproduction.

Further, the present invention provides, in a magneto-optical recording/reproducing method in which laser light is radiated and focused onto an optical recording medium, a change of a plane of polarization of light reflected from the optical recording medium is detected to form an electric signal, and information magnetically recorded on the optical recording medium is magneto-optically detected on the basis of the electric signal: a magneto-optical reproducing method wherein phase control optics for changing a phase of the reflected light is arranged in a light path of the reflected light so that a quantity of phase compensation of the phase control optics is controlled on the basis of the electric signal.

Preferably, learning regions may be discretely provided on the recording medium, and the electric signal is monitored while changing a quantity of the phase change while the laser is radiated onto the learning regions to detect an optimum value of the quantity of the phase change. Preferably, reference marks are provided in the learning regions, the change of the plane of polarization of the reflected light modulated by the reference marks is detected to form the electric signal, and the electric signal is monitored to detect the optimum value of the quantity of the phase change. Preferably, the optimum value of the quantity of the phase change is stored so that the phase control optics is controlled on the basis of the stored optimum value. Preferably, an optical disk in which guide grooves and lands thereof are made to be a information storage region is used as the recording medium.

To record information both in guide grooves and on lands between the guide grooves and reproduce information from both the guide grooves and the lands, there id provided a magneto-optical reproducing method in which laser light is radiated as a light spot onto a magneto-optical recording medium in which information marks are recorded both on a guide groove and on a land adjacent to the guide groove, and recorded information is reproduced on the basis of a change of a state of polarization of the reflected light, wherein a quantity of light of the light spot on the guide groove is selected to be substantially equal to a quantity of light of the light spot on the land at the time of signal reproduction. Preferably, the laser light is radiated tracking the boundary between the guide groove and the land. Preferably, information in the guide groove and information on the land are reproduced simultaneously.

In this occasion, the depth of the guide groove is preferably selected to be about $\lambda/8$ when the width of the guide groove is substantially equal to the width of the land and optical wavelength in the substrate, of reproduced light for reproducing information is $\lambda$. Further, the depth of the guide groove is preferably selected to be in a range of from $\lambda/13$ to $\lambda/8$ when the width of the guide groove is substantially equal to the width of the land and the optical wavelength in the substrate, of reproduced light for reproducing the information is $\lambda$. By such design, crosstalk between information from the guide groove and information from the land can be prevented.

As an information reproducing apparatus, there may be provided an optical disk device which comprises: a light source for emitting light; focusing optics for radiating and focusing the light onto a magneto-optical recording medium; a photo-detection system for detecting reflected light of the light radiated by the focusing optics; and a reproduction circuit for forming an information reproduction signal by using a signal from the photo-detection system;

wherein the photo-detection system includes:

a) phase difference optics for separating a beam of reflected light from an optical recording medium into first and second regions and giving a phase difference to linear polarization components perpendicular to each other in each of the regions so that the phase differences in the respective regions have signs different from each other;

b) a polarized beam splitter for separating the beam of reflected light given the phase differences into beams of light in two directions;

c) first and second photo-detectors for detecting the separated beams of light, each of the photo-detectors having a first portion for detecting the first region, and a second portion for detecting the second region;

and wherein the reproduction circuit includes:

a first differential amplifier for forming a difference signal indicating a difference between the first portion of the first photo-detector and the first portion of the second photo-detector; and a second differential amplifier for forming a difference signal indicating a difference between the second portion of the first photo-detector and the second portion of the second photo-detector. In such an apparatus, information from the guide groove and information from the land can be reproduced simultaneously with each other.

Further, in a magneto-optical reproducing method in which laser light is radiated as a light spot onto a magneto-optical recording medium in which information marks are recorded both in guide grooves and on lands adjacent to the guide grooves so that recorded information is reproduced on the basis of a change of a state of polarization of reflected light, an information reproducing method comprises the steps of: making a quantity of light of the light spot on one of the guide grooves substantially equal to a quantity of light of the light spot on one of the lands adjacent to the one guide groove at the time of signal reproduction; separating a beam of reflected light from the magneto-optical recording medium into a first region as reflected light from the one guide groove and a second region as reflected light from the one land; giving a phase difference to linear polarization components perpendicular to each other in each of the first and second regions, the phase differences in the respective first and second regions being different in sign from each other; separating a light beam of the first region having a given phase difference into first and second polarization components; separating the light beam of the second region having another given phase difference into third and fourth polarization components; detecting rotations of planes of polarization of the four, first to fourth, polarization components to form first, second, third and fourth electric signals respectively; forming a first difference signal which is a signal indicating a difference between the first and third electric signals; forming a second difference signal which is a signal indicating a difference between the second and fourth electric signals; reproducing an information mark formed in the guide groove on the basis of the first difference signal; and reproducing an information mark formed on the land on the basis of the second difference signal. Thus, two data series are reproduced simultaneously with each other from a medium of high recording density.

Incidentally, a conventional example in which means for compensating phase difference is provided is disclosed in Japanese Patent Application Un-examined Publication No. JP-A-2-76143.

DESCRIPTION OF THE PREFERRED EMBODIMENTS

Embodiments of the present invention will be described below in detail.

Figure 2:
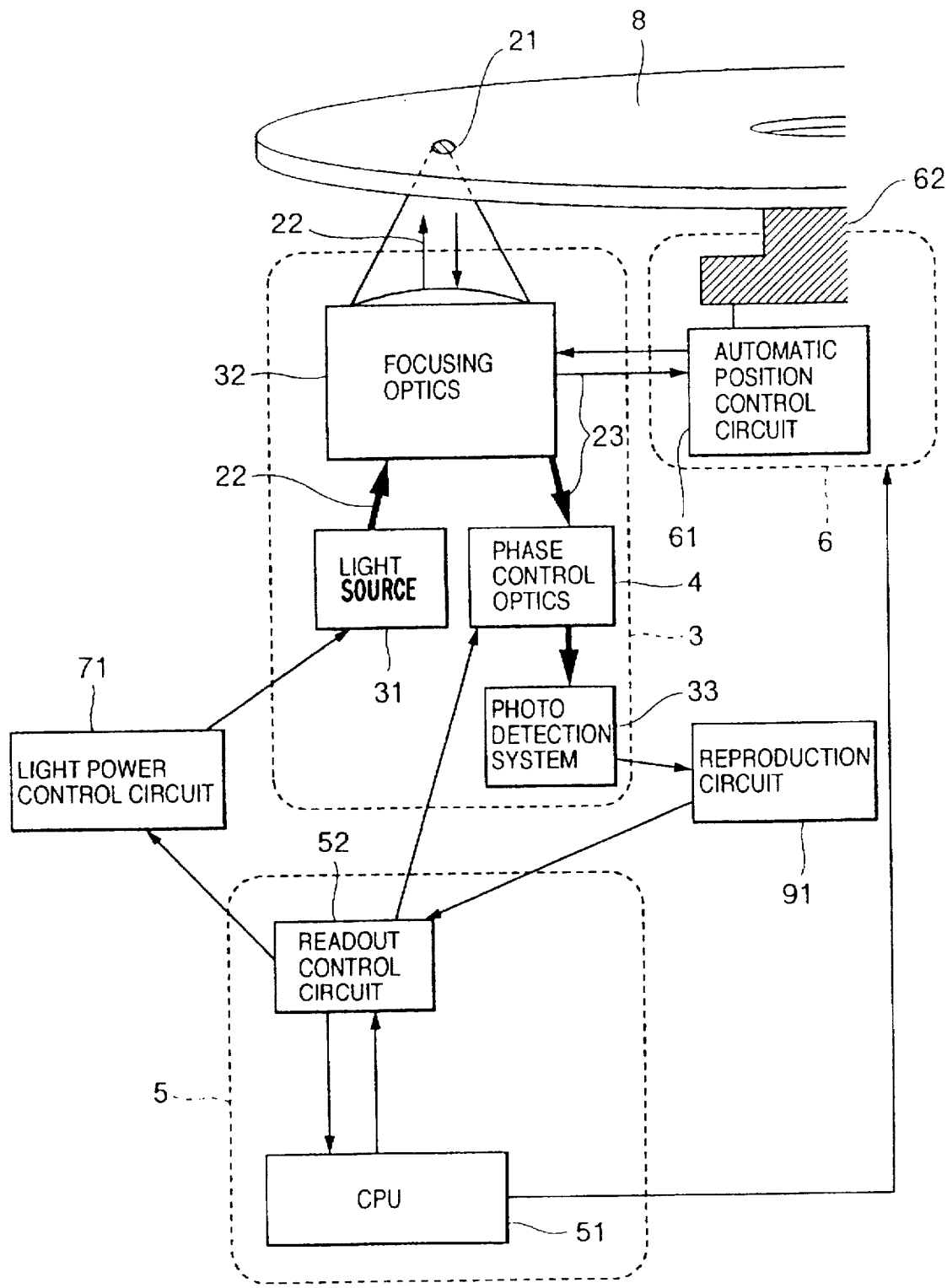
FIG. 2 is a view showing the configuration of an embodiment of the magneto-optical recording apparatus according to the present invention.
Figure 3:
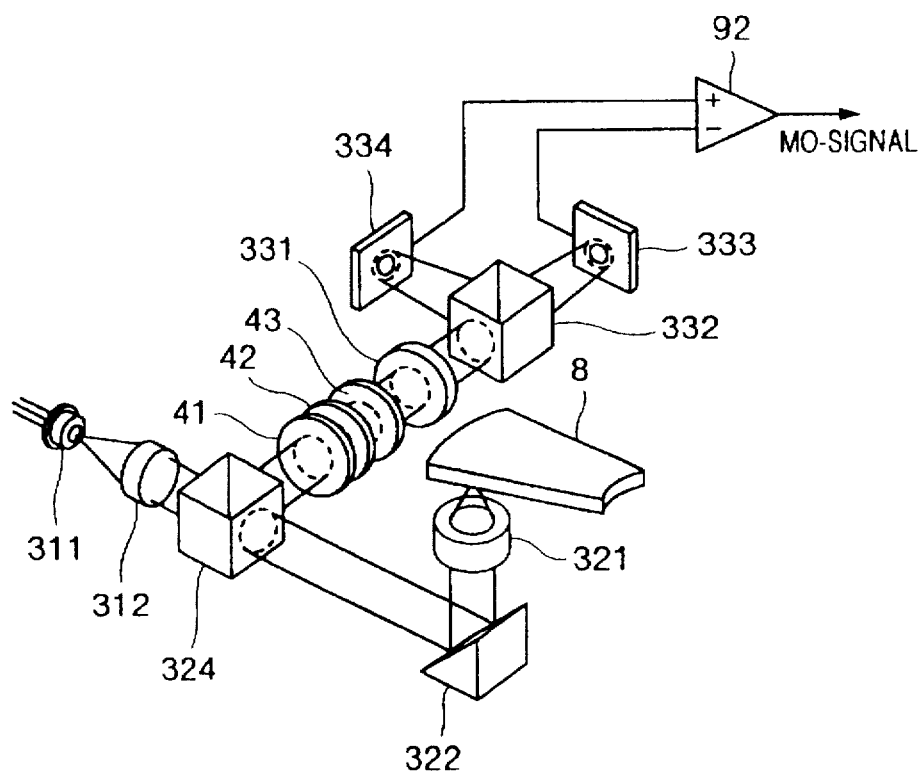
FIG. 3 is a partial view showing the configuration of an embodiment of the magneto-optical recording apparatus according to the present invention.

FIG. 2 shows an example of the configuration of a magneto-optical recording/reproducing apparatus according to the present invention, and FIG. 3 shows an example of the configuration of an optical head 3 in this apparatus.

In this embodiment, a semiconductor laser 311 with a wavelength of 680 nm and a collimate lens 312 are used as an optical source 31. If necessary, a beam shaping optical system such as a prism, or the like, may be used. The light power of the semiconductor laser is controlled by a light power control circuit 71 having an automatic light power control function. Light 22 emitted from the light source 31 is focused on a magneto-optical recording medium 8 by focusing optics 32. The focusing optics 32 includes at least one lens 321. In this embodiment, the focusing optics 32 further includes a beam splitter 324, and a riser mirror 322. The numerical aperture of the objective lens 321 focusing light on the optical recording medium 8 is selected to be 0.55. Accordingly, the diameter of a light spot 21 on the magneto-optical recording medium 8 is 1.1 μm. The light spot can be moved to an arbitrary position on the optical recording medium 8 by a scanning means 6.

The scanning means 6 at least includes a motor 62 for rotating the disk-like magneto-optical recording medium 8, and an automatic position control circuit 61 having an automatic focusing control function and an automatic tracking function. The automatic position control circuit 61 utilizes the reflected light 23 from the magneto-optical recording medium 8 to perform feedback control. The reflected light from the light spot 21 is led to a photo-detection system 33 by a polarized beam splitter 324 in the focusing optics 32 via a phase control optics 4 which will be described later in detail. The photo-detection system 33 has a lens 331, a polarized beam splitter 332, and photo-detectors 333 and 334. The reproduction signal obtained as an electric signal transformed by the photo-detection system 33 is led to a reproduction circuit 91 having a decoding circuit, etc., so that recorded information is decoded. Reproduction information is fed to a main control circuit 5 which has a readout control circuit 52, a CPU 51, etc. as will be described later in detail. The readout control circuit 52 adjusts the quantity of phase compensation of the phase control optics 4. All of these operations are monitored and controlled by the CPU 51. The CPU 51 also performs control for exchange of recording/reproducing information with the outside, recording thereof, etc.

Figure 4:
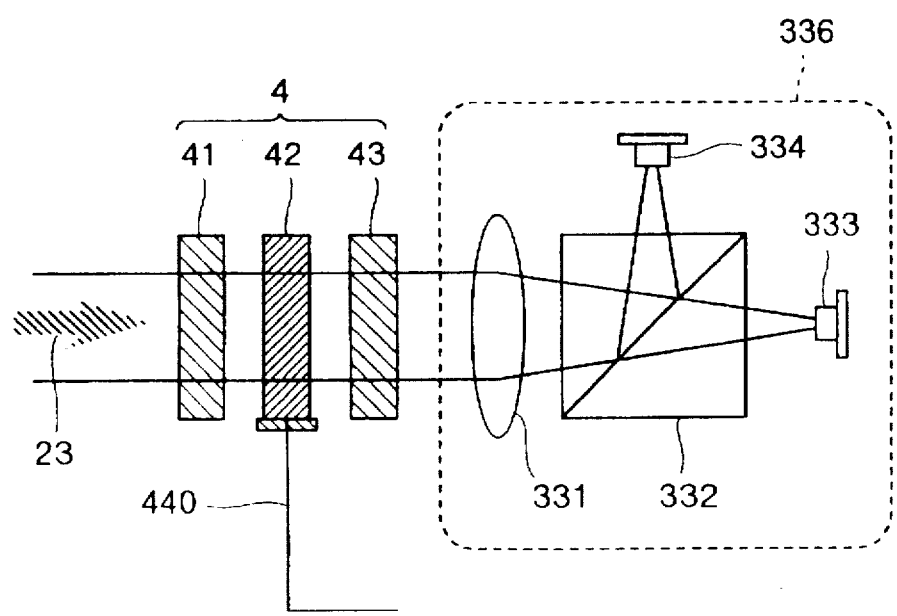
FIG. 4 is a partial view showing the configuration of an embodiment of the magneto-optical recording apparatus according to the present invention.

FIGS. 3 and 4 show an example of the detailed configuration of the phase control optics 4. The phase control optics 4 has a first quarter wave plate 41, a half wave plate 42 and a second quarter wave plate 43 which are arranged in order with respect to the reflected light 23. The phase control optics 4 further has a mechanism 44 for rotating the half wave plate 42 around the optical axis of the reflected light. The low-speed axis or high-speed axis of the first quarter wave plate 41 is controlled to be made coincident with the direction of the plane of polarization (P polarization) parallel to the polarization of the reflected light of the radiated light or the direction of the plane of polarization (S polarization) perpendicular to the polarization of the reflected light.

As a result, when light passes through the first quarter wave plate, S polarization and P polarization are transformed into right turning (left turning) circular polarization and left turning (right turning) circular polarization, respectively. This light is transformed by the half wave plate 42 from right turning circular polarization to left turning circular polarization, and vice versa. In this occasion, a phase difference arises between the two kinds of circular polarization correspondingly to the angle of the half wave plate 42. The phase difference which arises in this occasion is 4α when the angle of the half wave plate 42 is α.

When light then passes through the second quarter wave plate 43, the two kinds of circular polarization are transformed again into two kinds of linear polarization which are perpendicular to each other. The two kinds of linear polarization correspond to S polarization and P polarization of the reflected light but the phase difference therebetween is 4α. That is, by the configuration shown in FIG. 4, the phase difference between S polarization and P polarization can be adjusted desirably. In this occasion, the adjustment can be achieved by a simple mechanism which rotates the angle of the half wave plate 42 around the optical axis of the reflected light. As the rotation mechanism 44, there can be used a servofunction-including voice coil motor, or the like.

Figure 5:
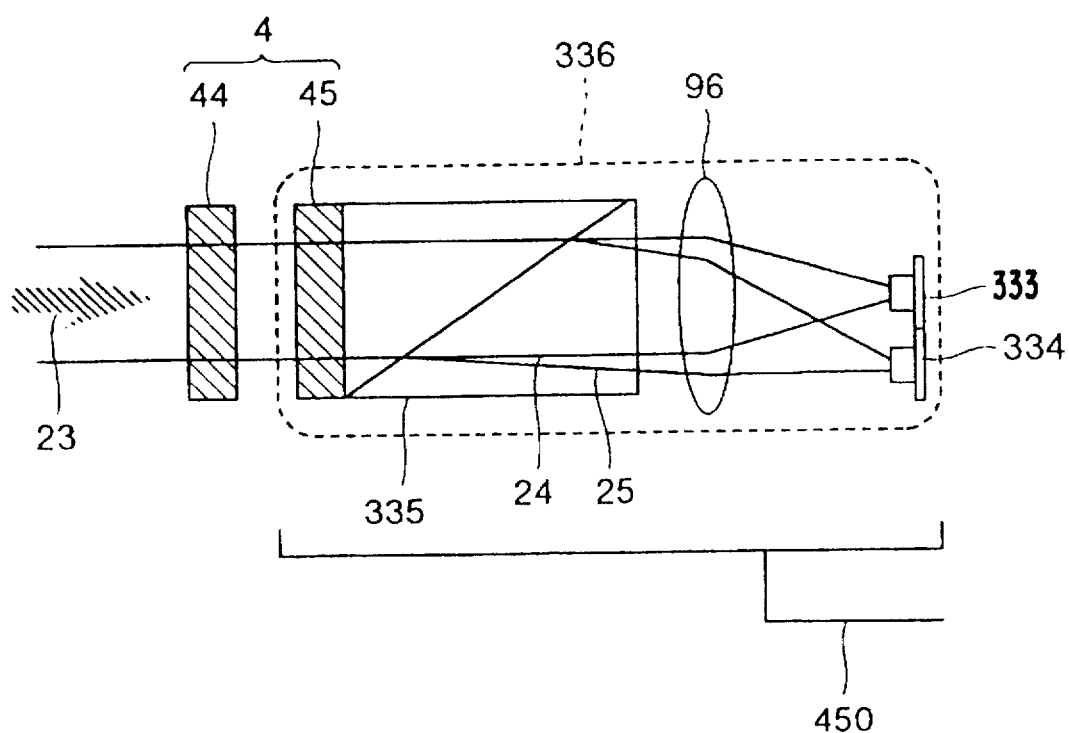
FIG. 5 is a partial view showing the configuration of an embodiment of the magneto-optical recording apparatus according to the present invention.

FIG. 5 shows another example of the configuration of the phase control optics 4 and the photo-detection system 33.

The phase control optics 4 has a first quarter wave plate 44, and a second quarter wave plate 45 which is rotatably united with a polarization detector 336. The polarization detector 336 has a Wollaston prism 335, a lens 96, and two photo-detectors 333 and 334. The Wollaston prism 335 separates incident polarized light into two kinds of polarization components, namely, ordinary light rays 24 and extraordinary light rays 25. These two kinds of polarization components are perpendicular to each other. The polarization axis of the Wollaston prism 335 and the high-speed or low-speed axis of the second quarter wave plate 45 are fixed closely to each other to form an angle of 45 degrees. The photo-detection system 33 has the polarization detector 336 which is constituted by the lens 331, the polarized beam splitter 332, and the photo-detectors 333 and 334. For phase control, the second quarter wave plate 45 is unitedly rotated together with the polarization detector 336. In this example, a stepping motor is used as a rotation mechanism.

The effect in use of this apparatus will be described below in comparison with the conventional apparatus.

Figure 6:
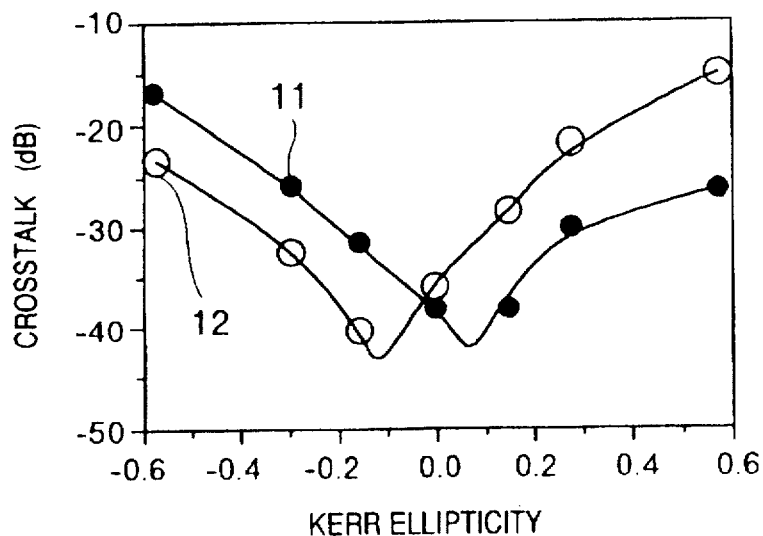
FIG. 6 is a graph showing a problem in a conventional magneto-optical recording apparatus.

FIG. 6 shows the examined relation between Kerr ellipticity and track-to-track crosstalk of the magneto-optical recording medium 8 in the conventional apparatus. In this case, the magneto-optical recording medium 8 having groove portions of depth 90 nm and land portions arranged alternately was used. The width of each of the land and groove portions was 0.6 μm. The quantity of crosstalk in the ordinate axis is expressed logarithmically as the rate of information leaked from adjacent groove portions when the light spot 21 is located on a land portion in the case where information is recorded on both land portions and groove portions of the aforementioned medium.

FIG. 6 shows crosstalk (crosstalk 11 observed from a land portion) in the case where the light spot is located on the land portion, and crosstalk (crosstalk 12 observed from a groove portion) in the case where the light spot is located on the groove portion). When Kerr ellipticity is small, the crosstalk is sufficiently small in both cases. That is, crosstalk is small. Crosstalk, however, increases as Kerr ellipticity becomes farther from 0. The quantity of crosstalk in the land portion is different from that in the groove portion. Although FIG. 6 shows the case where Kerr ellipticity is taken as an example of variety of the medium, crosstalk increases similarly in the conventional case even if the depth of grooves, the optical phase difference of the optical head element, the aberration thereof, the focal position thereof, or the like, varies. Here, Kerr ellipticity originally expresses the elliptic polarization ratio of reflected light. It is nothing but a phase difference arises between the P polarization component and S polarization component of the reflected light. Similarly, all the other varieties have an influence on the phase difference of polarization of reflected light.

In the present invention, these varieties are compensated by giving a phase difference between P polarization and S polarization of reproduced light so that reproduction can be performed with phase control to normally minimize the crosstalk component of the reproduction signal.

Figure 7:
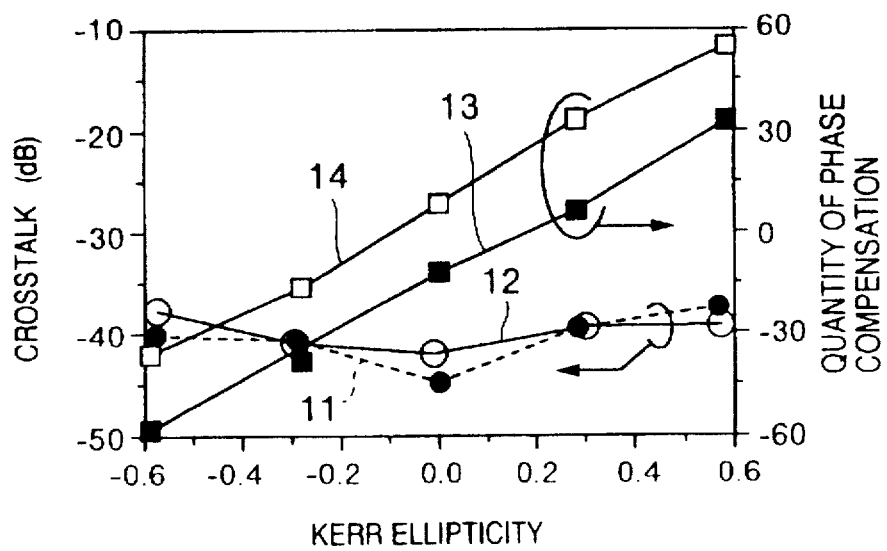
FIG. 7 is a graph showing the effect of an embodiment of the magneto-optical recording apparatus according to the present invention.
Figure 8:
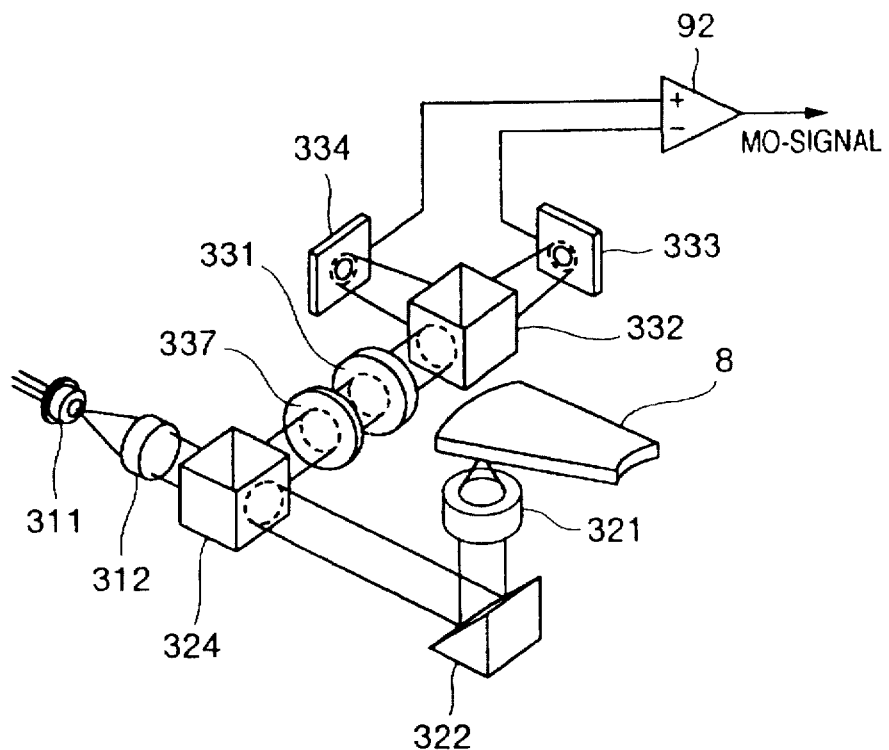
FIG. 8 is a partial view showing the configuration of the conventional magneto-optical recording apparatus.

FIG. 7 shows the effect of the present invention. Each crosstalk 11, 12 can be always suppressed to a low level of not larger than −35 dB by changing the phase control quantity 13, 14 correspondingly to Kerr ellipticity according to the present invention.

In the case where phase varieties arise in practice, in the reproduction control circuit 52 of FIG. 2, the phase control quantity of the phase control optics 4, that is, the angle of rotation of the half wave plate 42, is adjusted on the basis of the reproduction signal from the reproduction circuit 91 as means for correctly detecting the phase control quantities 13 and 14 to minimize detection jitter (noise).

Incidentally, in the case where recording is to be performed by the apparatus of FIG. 2, recording light 22 having a light power controlled by the light power control circuit 71 is radiated onto the magneto-optical recording medium 8 to form a light spot 21. A recorded domain (not shown) is formed in a region which is heated up to the neighborhood of the Curie temperature of the medium by the light spot 21. In this embodiment, the width of about 0.6 μm can be provided as the size of the recorded domain. Further, in this embodiment, the magneto-optical recording medium 8 used has a TbFeCo recording film. The Curie temperature of the medium 8 is about 200° C. Therefore, light power is controlled so that the temperature of the about 0.6 μm wide region on the magneto-optical recording medium 8 exceeds 200° C. In this occasion, light power is 6.5 mW. When the temperature of the about 0.6 μm wide region on the magneto-optical recording medium 8 exceeds the Curie temperature as described above, a modulation field is applied to the neighborhood of the region by a magnetic field application means (not shown). As a result, magnetization of the about 0.6 μm wide region is oriented in the direction of the modulation field so that information recording can be performed.

Figure 1:
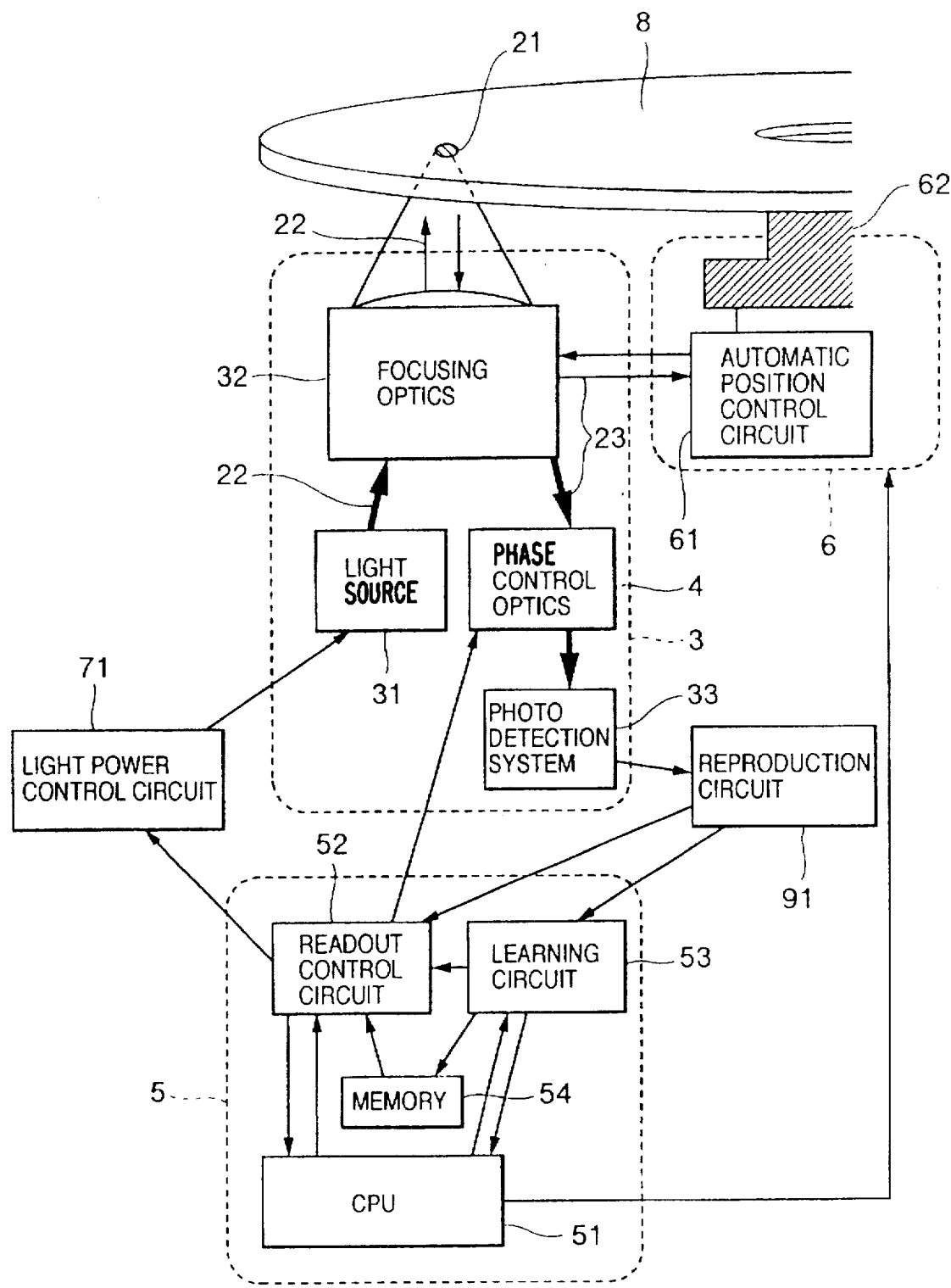
FIG. 1 is a view showing the configuration of an embodiment of the magneto-optical recording apparatus according to the present invention.

FIG. 1 is a configuration diagram showing another embodiment. The basic configuration in FIG. 1 is the same as that shown in FIG. 2. In FIG. 1, parts the same as or equivalent to those in FIG. 2 are referenced correspondingly, for simplification of description. Points of differences between those embodiments will be described below. In this embodiment, a laser diode 311 with second harmonic generator having a wavelength of 530 nm and a collimating lens 312 were used as the light source 31. In this embodiment, the main control means 5 is constituted by a learning control circuit 53, a memory 54 as a storage circuit, a readout control circuit 52 and a CPU 51.

A method of controlling the phase difference by using the learning control circuit 53 in the embodiment of FIG. 1 will be described.

To perform learning of the optimum phase difference, the light spot is first moved to a learning region on the optical recording medium 8 and information recorded in the learning region is then reproduced to detect noise components such as a quantity of crosstalk, or the like, while the phase control quantity is changed by the phase control optics 4. Then, a phase control quantity to minimize crosstalk is calculated and stored in the memory 54.

The aforementioned learning procedure is performed in several regions on the medium 8 at the time of attachment of the medium 8. Learning marks may be recorded in advance on the learning regions so that the crosstalk component can be separated and detected selectively.

For performing reproduction of information in practice, the phase control optics 4 is controlled to a suitable value by referring to the memory 54 before reproduction.

Because an optimum phase state can be always achieved regardless of the change of characteristic of the recording medium, the method in this embodiment is adapted to high-density recording using polarization characteristic such as land-groove recording, or the like. Further, because attention is always paid to crosstalk so that the quantity of crosstalk can be minimized even in the case where various types of phase varieties arise simultaneously, the method in this embodiment is particularly suitable for narrow track recording.

The effect of the present invention is not limited to the aforementioned embodiment. For example, there may be used phase control optics having a mechanism for rotating a high-order phase plate around the high-speed or low-speed axis thereof. Further, there may be used an optical head having a mechanism for generating a plurality of light spots simultaneously. Besides the medium having grooves, a medium having substantially circular pit portions may be used. In this case, the phase difference is preferably adjusted so that information only in bottom portions of pits can be detected selectively. As a result, the form of each recorded mark is limited by the bit form effectively, so that deterioration of signal quality due to disturbance at the recording process is avoided. Accordingly, this case is suitable for high-density recording.

Even in the case where the optical element of the optical head or the magneto-optical recording medium has optical anisotropy, optical rotary power, optical phase difference (retardation) or circular dichroism (Kerr ellipticity), an optimum optical phase state can be always achieved so that, for example, reproduction of high-density magneto-optical recording sufficiently small in crosstalk can be achieved as shown in FIG. 7.

An embodiment in which the track pitch of an optical disk is narrowed to improve recording density will be described below.

A conventional example described in Symposium of Optical Memory '94 Technical Digest (1994) pp. 35–37, 41–42 will be described. In this literature, there is a description about a technique in which the width of each guide groove and the distance between adjacent guide grooves are selected to be substantially equal to each other while keeping the guide groove pitch substantially equal to the conventional guide groove pitch in order to improve recording density of a magneto-optical disk so that recorded domains carrying recording information are recorded both in guide grooves and lands between guide grooves to substantially double recording density. Even in the case where a spot is located over a land (or guide groove) adjacent to a guide groove (or land) to be subjected to reproduction, signal crosstalk from the adjacent recorded domain can be canceled by the effect of the phase difference if the depth of the groove is adjusted. The aforementioned literature describes that optimum groove depth is about λ/6.

In the aforementioned conventional technique, there arises a problem that it is requires very severe accuracy in groove depth, groove width, optical system phase difference displacement, or the like, for canceling the crosstalk. The reason for this will be described under.

Figure 9:
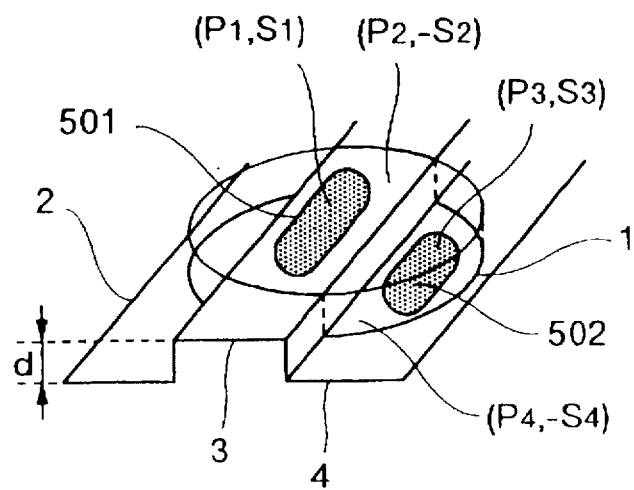
FIG. 9 is a view showing the arrangement of magneto-optical domain and light spot on a surface of a magneto-optical disk in the conventional case.

FIG. 9 shows the arrangement of recorded domains and a light spot on a surface of a conventional magneto-optical disk. The depth d of each guide groove is set so that a light spot 1 is radiated onto a land 3 between guide grooves of a magneto-optical disk 2 to reproduce a signal from a recorded domain 501 selectively and cancel crosstalk from a recorded domain 502 in a guide groove 4 adjacent to the land 3.

Figure 10A:
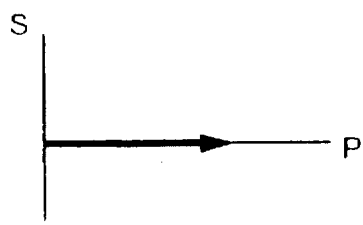
FIGS. 10A, 10B and 10C are diagrams for explaining the difference of sign between the inside of a domain and the outside of the domain in the case where polarization components perpendicular to incident polarization are produced by Kerr effect.
Figure 10B:
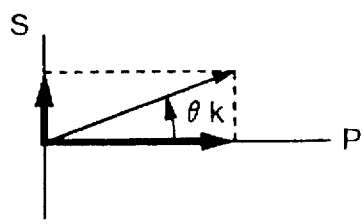
Figure 10C:
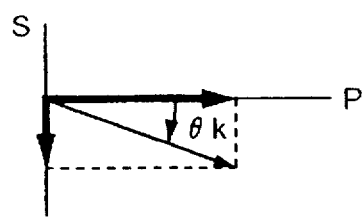

FIGS. 10A to 10C show polarization states of light. FIG. 10A shows a polarization state of light incident into a medium, FIG. 10B shows a polarization state of light reflected from a recorded domain on the medium, and FIG. 10C shows a polarization state of light reflected from a position other than the domain on the medium. Assuming now that the polarization state of the light spot 1 is expressed simply by a P polarization component as shown in FIG. 10A and that the effect of polarization rotation in the inside and outside of the domain due to the magnetic Kerr effect is as shown in FIGS. 10B and 10C, then the P and S polarization components of the whole reflected light are expressed approximately as follows:

$$S = S_1 - S_2 + (S_3 - S_4)e^{i\phi} \quad (1)$$

$$P = P_1 + P_2 + (P_3 + P_4)e^{i\phi} \quad (2)$$

in which S represents a polarized light component generated by polarization rotation so as to be perpendicular to the direction of polarization of incident polarized light, P represents a polarized light component parallel to incident polarized light, the subscript 1 represents reflected light in the inside of the recorded domain 501 to be reproduced, the subscript 2 represents reflected light in the outside of the recorded domain 501 on the land 3 between guide grooves 4, the subscript 3 represents reflected light in the inside of the recorded domain 502 in a guide groove 4 adjacent to the land 3 to form crosstalk, and the subscript 4 represents reflected light in the outside of the recorded domain 502 in the adjacent guide groove 4. Further, φ is a phase difference given by the expression 3 on the basis of groove depth d.

$$\phi = \frac{4\pi d}{\lambda} \quad (3)$$

Because the magneto-optical signal in this occasion is differentially detected by the polarized beam splitter which is inclined at 45° with respect to the direction of linear polarization of incident light, the following expression is given:

$$\begin{aligned} MO &= lPsin45° + Ssin45°l^2 - lPcos45° + Scos45°l^2 \quad (4) \\ &= PS^* + P^*S \\ &= \{P_1 + P_2 + (P_3 + P_4)e^{i\phi}\}\{S_1 - S_2 + (S_3 + S_4)e^{-i\phi}\} + \\ &\quad \{P_1 + P_2 + (P_3 + P_4)e^{-i\phi}\}\{S_1 - S_2 + (S_3 + S_4)e^{i\phi}\} \\ &= 2(\alpha + \beta\cos\phi)(S_1 - S_2) + 2(\alpha\cos\phi + \beta)(S_3 - S_4) \end{aligned}$$

in which $$\alpha = P_1 + P_2$$

$$\beta = P_3 + P_4 \quad (5)$$

Because $S_1 - S_2$ corresponds to the signal and $S_3 - S_4$ corresponds to crosstalk here, it is apparent that crosstalk can be canceled if the phase difference on the basis of groove depth may be selected as follows.

$$\cos\phi = -\frac{\beta}{\alpha} \equiv -\eta \quad (6)$$

The coefficient η is the ratio of the light power of a focused light spot on a land (or a guide groove) adjacent to a guide groove (or a land) to be reproduced to the light power of the focused light spot on the guide groove (or the land) and is a parameter determined on the basis of the groove width or land width with respect to the spot size. Accordingly, it is apparent that the groove width and the land width must be equal to each other to perform crosstalk cancellation both in the groove and on the land in a predetermined groove depth. If the signal-to-crosstalk ratio is defined as given by the following expression 7 in order to examine accuracy in groove depth, the following expression 8 is obtained in the groove depth satisfying the crosstalk canceling condition.

$$X = \frac{\cos\phi + \eta}{1 + \eta\cos\phi} \quad (7)$$

$$\left|\frac{dX}{d\phi}\right| = \frac{1}{\sqrt{1-\eta^2}} = \frac{1}{|\sin\phi|} \quad (8)$$

When, for example, crosstalk cancellation is performed in the groove depth λ/6 (λ represents the wavelength of light in the disk substrate), |dX/dφ|=1.155 is obtained because of η=0.5. In order to suppress crosstalk to 1/10, the displacement of groove depth need be selected to be ±0.1/(1.155× 2π×2)=±0.007λ approximately. Assuming now that the wavelength of light in the air and the refractive index of a substrate are 0.68 μm and 1.5, respectively, then the accuracy is about ±3 nm. Although the accuracy may be relaxed as sufficiently as possible if η is made small and the guide groove is made narrow, recording density is lowered nonsensically.

On the contrary, the object of this embodiment is to relax this adjustment accuracy.

In order to solve the aforementioned problem, in the present invention, a light spot radiated onto a surface of a magneto-optical disk is arranged on the boundary between a guide groove and a land. Further, the groove depth is made to be about λ/8. Further, a phase difference of about λ/8, inclusive of a phase difference based on substrate retardation and Kerr ellipticity, is given between a linearly polarized light component incident into the reproduction optics and a linearly polarized light component perpendicular thereto. Further, the sign of this phase difference is inverted between at the time of guide groove reproduction and at the time of land reproduction. If the optics is separated into two and the aforementioned operation is carried out on the two, the guide groove and the land can be reproduced simultaneously.

The crosstalk canceling effect of the magneto-optical signal changes correspondingly to the phase difference applied between P polarization and S polarization by the optical head. This will be described below.

Assuming that a phase difference ξ is given to return light, then S may be replaced by S exp(iξ) in the aforementioned expressions and the magneto-optical signal is given by the following expression 9 in the same manner as described above.

$$MO = 2\{\alpha\cos\xi + \beta\cos(\phi - \xi)\}(S_1 - S_2) + \quad (9)$$

$$2\{\alpha\cos(\phi + \xi) + \beta\cos\xi\}(S_3 - S_4)$$

Accordingly, even in the case where the groove depth is out of the condition of the expression 6, it is apparent that crosstalk cancellation can be performed if a phase difference determined by the following expression 10 is given.

$$\tan\xi = \frac{\cos\phi + \eta}{\sin\phi} \quad (10)$$

In this occasion, because the sign of φ in the case of reproduction of a guide groove is different from the sign of φ in the case of reproduction of a land between guide grooves, the sign of a phase difference need be switched in the optics.

In this occasion, the rate of crosstalk amplitude to signal amplitude is given as follows.

$$X = \frac{\cos(\phi + \xi) + \eta\cos\xi}{\cos\xi + \eta\cos(\phi - \xi)} \quad (11)$$

Accordingly, the partial differential thereof in the groove depth satisfying the crosstalk canceling condition is given as follows.

$$\left|\frac{\partial X}{\partial \phi}\right| = \left|\frac{1+\eta\cos\phi}{\sin\phi(\eta^2 + 2\eta\cos\phi + 1)}\right| \qquad (12)$$

If this is selected to be as small as possible, the accuracy of the groove depth can be improved approximately. Because η is the rate of the light power in the groove to the light power in the land in the spot and cannot be selected to be so large if the groove width and the land width are selected to be equal to each other, it is difficult to set the numerator in this expression zero. Accordingly, the accuracy of adjustment of groove depth can be relaxed if η is selected to be as large as possible in the neighborhood of $\phi=\pi/2$, that is, in the neighborhood of the groove depth λ/8. In order to increase η in practice in the condition that the groove width and the land width are set to be equal to each other, η=1 can be achieved if the spot is arranged between the groove and the land. In this occasion, the expression 12 is calculated as 0.5 and the accuracy of adjustment of groove depth to set crosstalk to 1/10 becomes ±0.16λ. In comparison with the preliminarily described case, the accuracy is relaxed by twice or more. From the expression 10, a phase difference ξ is 45°, that is, a λ/8 plate is preferably used.

When the light spot is arranged between the groove and the land, signal and crosstalk become exactly equal to each other so that a signal to be reproduced is selected on the basis of a phase difference given by the optics. Accordingly, if light reflected from the optical recording medium is branched into two so that a phase difference different in sign in each of the two is given between two kinds of orthogonal linear polarization, information recorded in a guide groove and information in a land adjacent to the guide groove can be reproduced simultaneously so that information transfer rate can be improved.

Because in practice the phase difference ξ includes retardation of the magneto-optical disk substrate and Kerr ellipticity of the recording film, it is however necessary to adjust the phase difference in optics so as to correspond to the λ/8 plate inclusively.

In a conventional example shown in FIG. 9, there is shown the case where information of the recorded domain 501 on a land 3 is to be reproduced. In this occasion, the light spot 1 is arranged on the land 3. In the case where the recorded domain 502 on a guide groove 4 is to be reproduced, the light spot is arranged on the guide groove 4.

Figure 11:
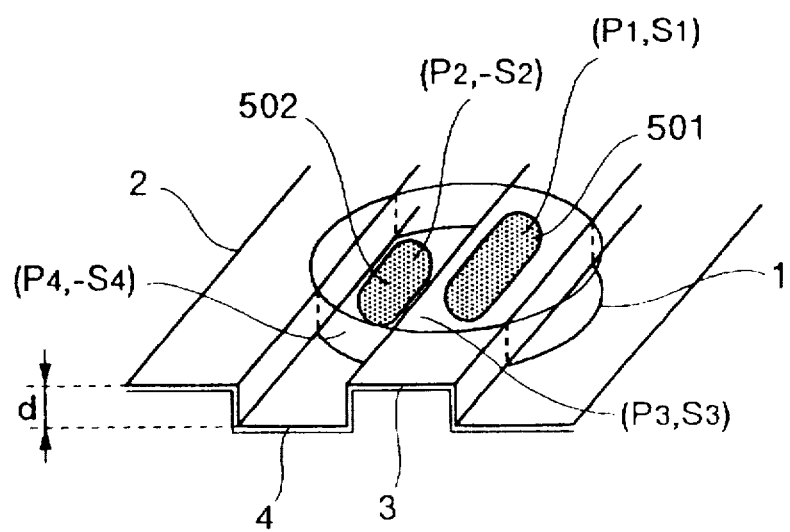
FIG. 11 is a view showing the arrangement of a light spot in the present invention.

FIG. 11 shows the configuration of this embodiment. Laser light is radiated as a light spot 1 onto a magneto-optical recording medium in which information marks 501 and 502 are recorded both in a guide groove 4 and on a land 3 adjacent to the guide groove 4, so that recorded information is reproduced on the basis of the change of the polarization state of reflected light. In this occasion, light power of the light spot on the guide groove is set to be substantially equal to light power of the light spot on the land at the time of reproduction. Further, signal reproduction is performed while the laser light is controlled to be radiated tracking the boundary between the guide groove and the land. When the width of each guide groove is substantially equal to the distance between adjacent guide grooves, and the wavelength, in the substrate, of the reproduced light for reproducing information is λ, the depth of the guide groove is made about λ/8. A magneto-optical recording film 500 is formed on the substrate.

In this embodiment, the light spot 1 is arranged on the boundary between the land 3 and the guide groove 4. If a phase difference in reproduction optics is optimized in this occasion, the range of groove depth to make crosstalk not larger than a predetermined value can be maximized by setting the groove depth d to λ/8 with respect to the wavelength λ of light in the substrate.

Figure 12:
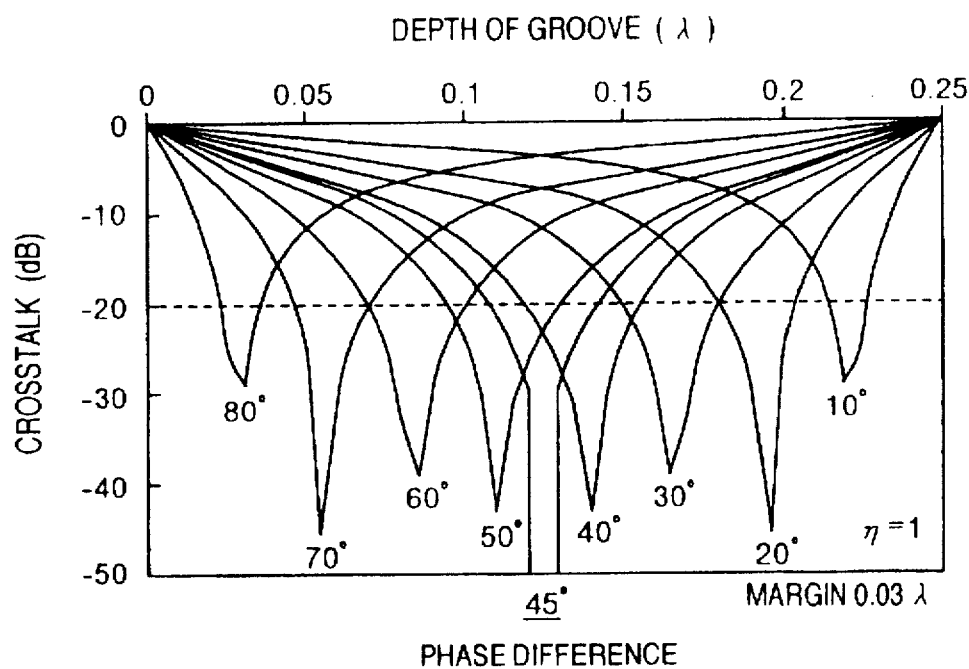
FIG. 12 is a graph showing the relations between the groove depth, the phase difference and the crosstalk in the present invention.

FIG. 12 shows the effect of this embodiment. In FIG. 12, η=1 is established in the case of spot arrangement shown in FIG. 11. In the graph, the abscissa axis shows groove depth, the ordinate axis shows crosstalk, and numerical characters given to curves respectively show a phase differences in optics. A phase difference to maximize the margin of groove depth to make crosstalk 1/10, that is, not larger than −20 dB is underlined. In FIG. 12, the phase difference is 45° and the groove depth is 0.125λ, that is, λ/8. The margin 0.03λ in this occasion is shown in the lower right of FIG. 12. This value is substantially equal to the preliminarily estimated value 0.016λ×2.

Figure 13:
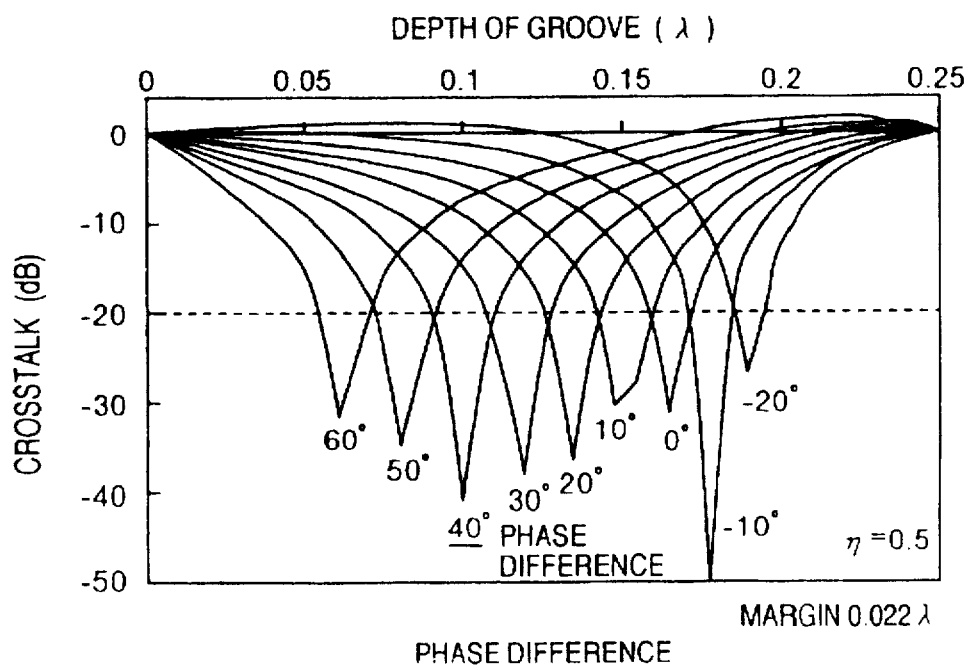
FIG. 13 is a graph showing the relations between the groove depth, the phase difference and the crosstalk in the prior art.
Figure 14:
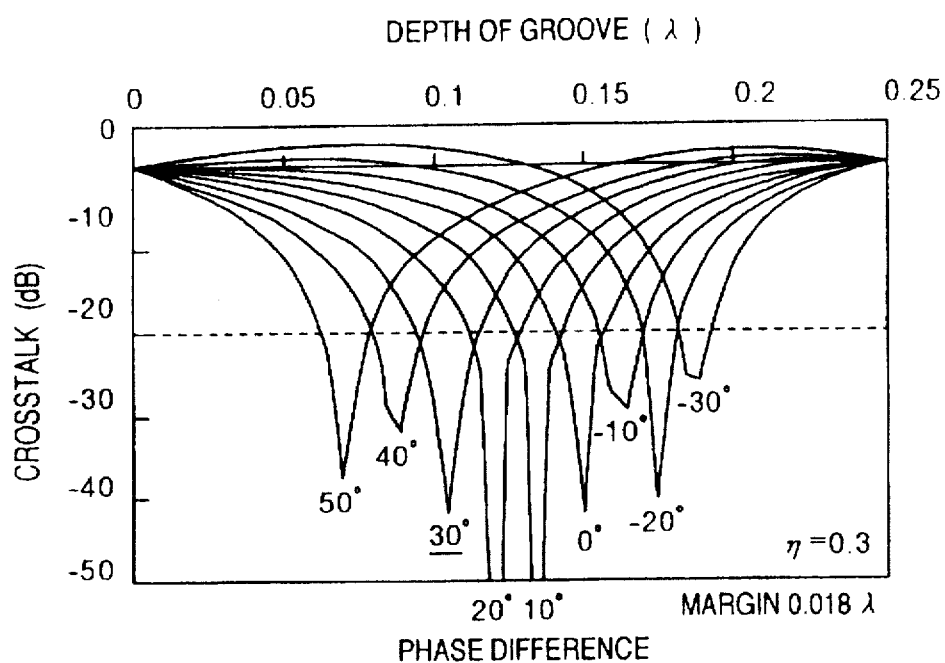
FIG. 14 is a graph showing the relation between the groove depth, the phase difference and the crosstalk in the case where the rate of light power on the land to light power on the groove is low.

FIGS. 13 and 14 show examples of calculation in the case where the ratio of the light power on the groove to the light power on the land is changed. FIG. 13 shows the case of η=0.5 substantially equivalent to the conventional case. FIG. 14 shows the case of η=0.3 smaller than the case of FIG. 13. In this occasion, FIGS. 13 and 14 have almost the same tendency as that of FIG. 12 but the groove depth to maximize the margin of groove depth is smaller than λ/8 but near λ/10. Assuming now the range of from λ/13 to λ/8 as a range around λ/10 and containing λ/8, then the groove depth to maximize the margin of groove depth can be found also in the conventional case where the spot is arranged in the center of the land or groove.

Assuming the case where a phase difference is out of its optimum value in groove depth to maximize the margin of groove depth in FIGS. 12, 13 and 14, then it is understood that, for example, the displacement of a phase difference to make crosstalk not larger than −20 dB is about ±5° and does not change in any case.

Figure 15:
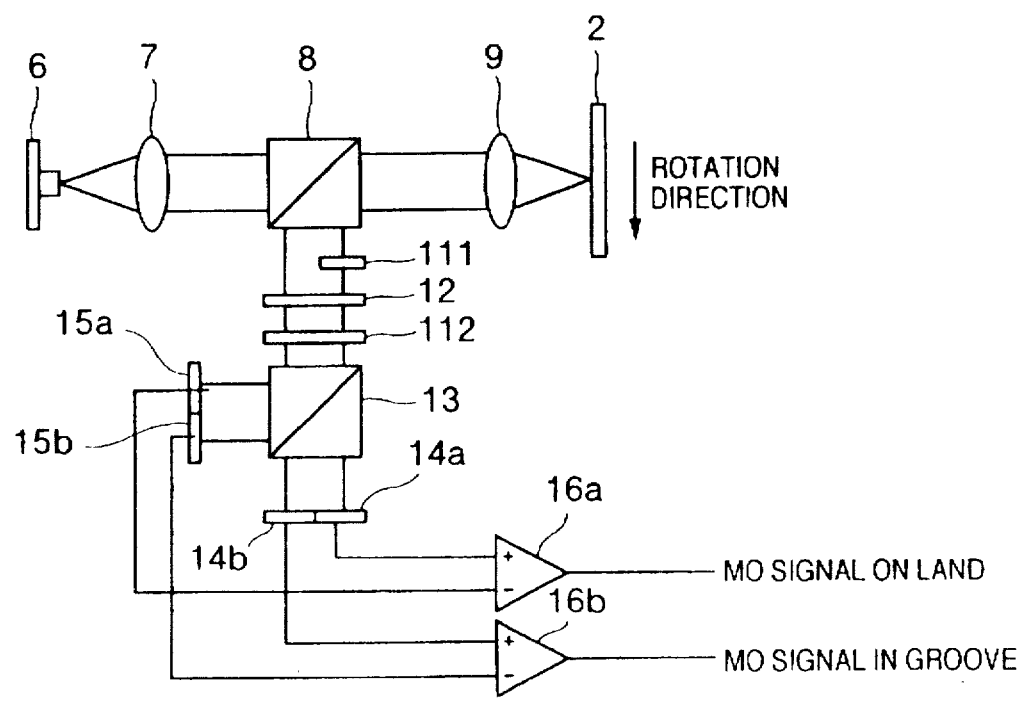
FIG. 15 is a view showing a first embodiment of an optical head according to the present invention.

FIG. 15 shows a further embodiment. In this embodiment, the case of η=1 is shown and information of the guide groove and information of the land are reproduced simultaneously. Light from the laser diode 6 is collimated by the collimating lens 7 and the collimated light is focused on the magneto-optical disk 2 by the objective lens 9 through the beam splitter 8. Reflected light is reflected from the beam splitter 8 and a phase difference between a polarization component parallel to the plane of FIG. 15 and a polarization component perpendicular to the plane of FIG. 15 is inverted by half the light beam by means of a λ/2 plate 111 inserted by half the light beam. When light is then made to pass through a λ/8 plate 12 equivalent to a phase difference 45°, the sign of the phase difference 45° is effectively inverted between the light transmitted through the λ/2 plate 111 and the light not transmitted through the λ/2 plate 111. Further, the direction of polarization of the light is rotated by 45° by a second λ/2 plate 112 for differential detection so as to be incident into the polarized beam splitter 13, so that the light transmitted through the polarized beam splitter 13 and the light reflected from the polarized beam splitter 13 are detected by photo-detectors 14a, 14b, 15a and 15b while separated into a region in which light passes through the first λ/2 plate 111 and another region in which light does not pass through the first λ/2 plate 111. When magneto-optical signals are obtained by differential amplifiers 16a and 16b, respectively, the magneto-optical signal on the land and the magneto-optical signal on the groove can be reproduced simultaneously with but independently of each other.

Figure 16:
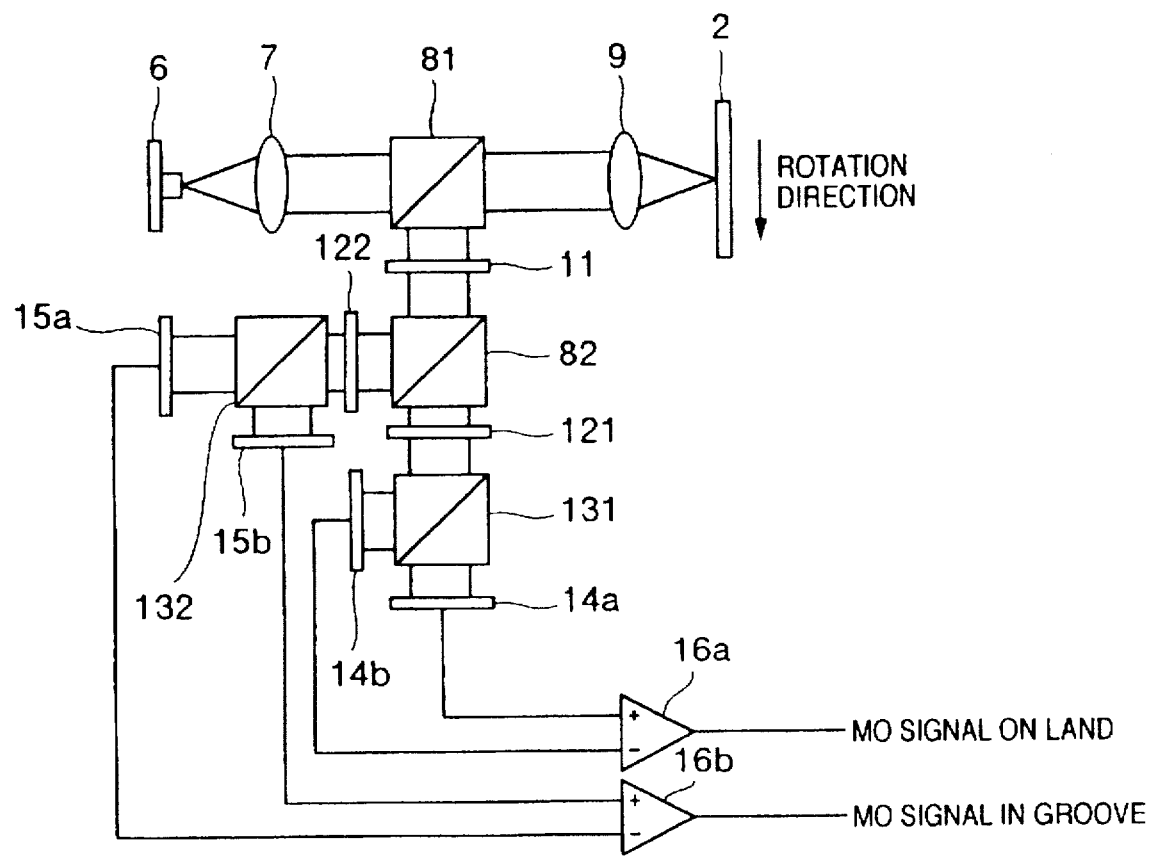
FIG. 16 is a view showing a second embodiment of the optical head according to the present invention.

FIG. 16 shows a further embodiment of an optical head according to the present invention. The direction of polarization of light, reflected from the magneto-optical disk 2 and then reflected from the beam splitter 81, is rotated by 45° by the λ/2 plate 11 and then separated into two light beams by a beam splitter 82. The light beams are made to pass through λ/8 plates 121 and 122 and separated into linearly polarized light components perpendicular to each other by polarized beam splitters 131 and 132, respectively. Then, the linearly polarized light components are subjected to photoelectric transformation by photo-detectors 14a, 14b, 15a and 15b and magneto-optical signals are obtained by differential amplifiers 16a and 16b, respectively. In this occasion, if the directions of phase movement axes of the two λ/8 plates 121 and 122 are rotated by 45° reversely outward with respect to the plane of FIG. 16, the two magneto-optical signals become reproduction signals on the land and on the groove, respectively.

Because, in practice, the phase difference ξ also includes retardation of the magneto-optical disk substrate and Kerr ellipticity of the recording film, it is however necessary that a phase difference in optics inclusively is adjusted so as to be equivalent to the λ/8 plate. Therefore, a wave plate for compensating a phase difference caused by these factors may be provided in advance before a λ/8 plate giving a phase difference of ±45° is set.

In order to arrange the light spot on the boundary between the guide groove and the land, it is necessary that the conventional tracking error signal is controlled to be maximized or minimized.

Figure 17:
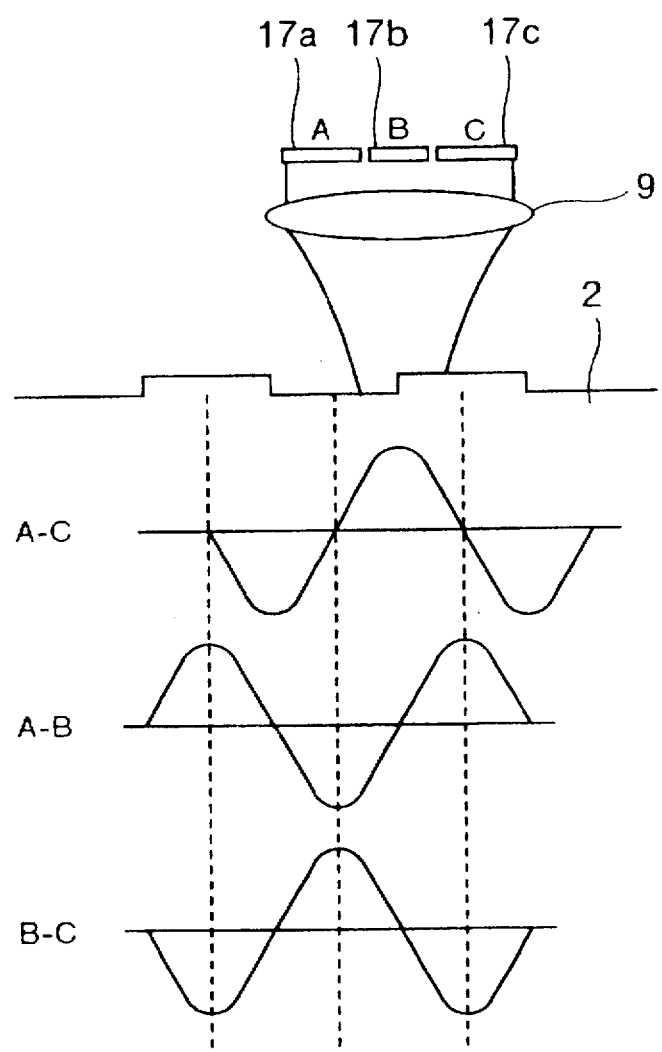
FIG. 17 is a diagram showing a first embodiment of tracking error signal detection.

FIG. 17 shows an example of the tracking error signal in the present invention. Light reflected from a surface of the magneto-optical disk 2 passes through the objective lens 9 so as to be incident into photo-detectors 17a, 17b and 17c. In FIG. 17, optical systems in the middle are omitted for simplification. Conventionally, a difference signal indicating a difference between the outputs of two photo-detectors obtained by splitting the flux of light by a split line passing through the center in the direction of the guide groove is used as the tracking error signal. Therefore, the difference signal (A–C) indicating a difference between the outputs of photo-detectors 17a and 17c is near the conventional tracking error signal, so that if this difference signal is used as a tracking error signal, the light spot can be controlled to be in the center of the guide groove or in the center of the land as in the conventional case. Accordingly, this may be used at the time of signal recording. On the other hand, if the differential output (A–B or B–C) between the photo-detectors 17a and 17b or between the photo-detectors 17b and 17c is made a tracking error signal at the time of reproduction, the light spot can be controlled to be on the boundary between the guide groove and the land.

Figure 18:
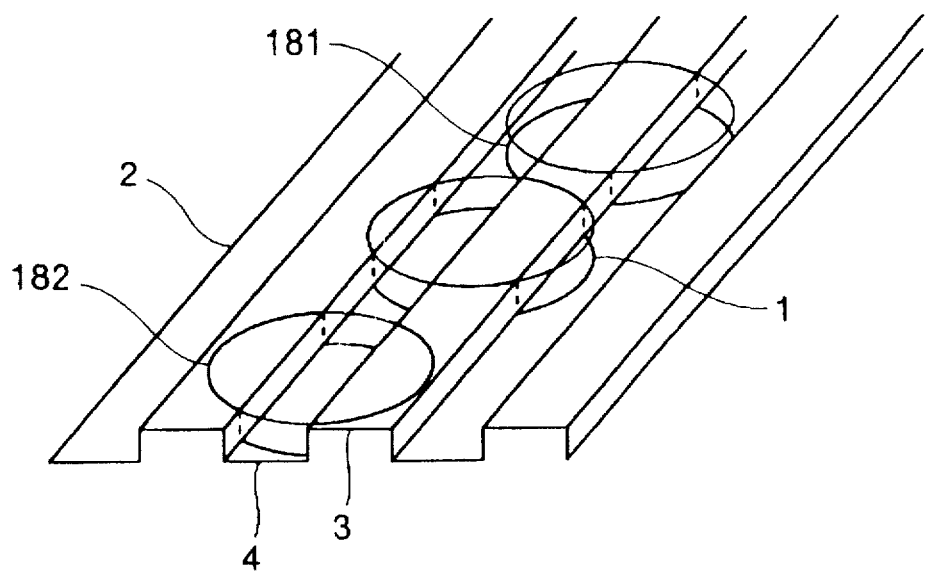
FIG. 18 is a view showing the arrangement of light spots in a second embodiment of tracking error signal detection.

FIG. 18 shows another method. Here, one main spot 1 and two sub-spots 181 and 182 are disposed on a surface of a magneto-optical disk. As a method of forming sub-spots, a diffraction grating may be used or three light sources may be prepared in advance. Here, the positional relations among the three spots are adjusted in advance so that two sub-spots are arranged on a land 3 and a guide groove 4, respectively when the main spot is located on the boundary between the land 3 and the guide groove 4.

Figure 19:
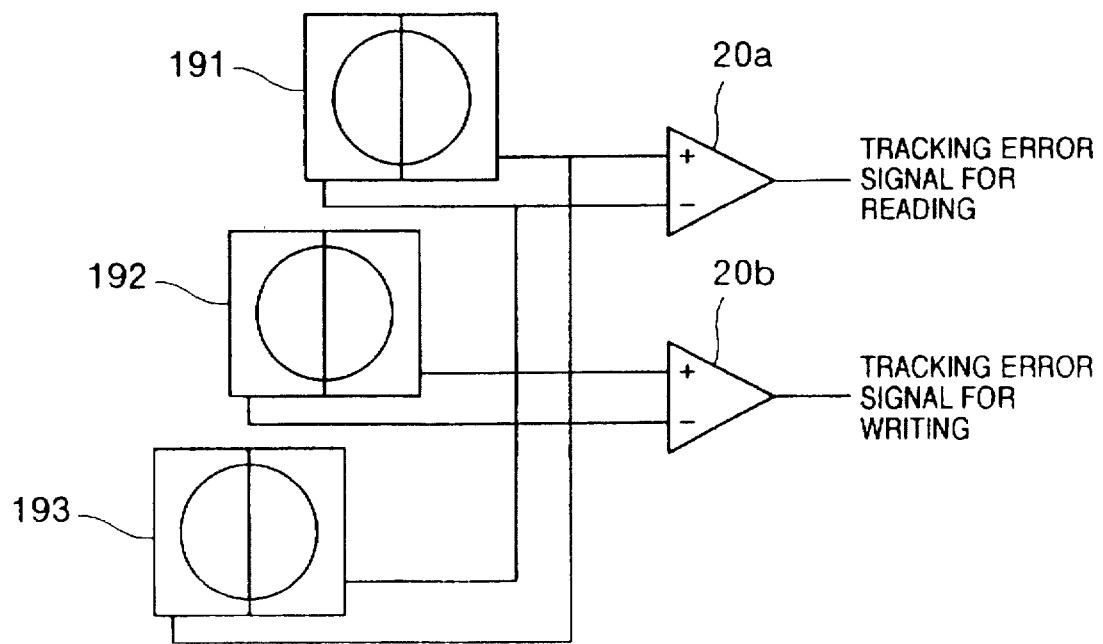
FIG. 19 is a diagram showing the second embodiment of tracking error signal detection.

FIG. 19 shows a system for detecting the three light spots in FIG. 18. Images of the light spots are detected by split photo-detectors 191, 192 and 193, respectively. The main spot 1 is detected by the photo-detector 192 and differentiated by a differential amplifier 20b to form a tracking error signal at the time of recording. The sub-spots 181 and 182 are detected by the photo-detectors 191 and 193 and differentiated by a differential amplifier 20a to form a tracking error signal at the time of reproduction. If these tracking error signals are fed back to a tracking actuator, light spots can be located on a guide groove and a land at the time of reproduction and a light spot can be located on a guide groove or a land at the time of recording.

According to the present invention, in a high-density magneto-optical disk in which the track pitch is narrowed so that information is recorded both in guide grooves and on lands, the margin of groove depth to cancel signal crosstalk from adjacent tracks can be enlarged so that productivity of a magneto-optical recording medium can be improved. Further, a signal from a guide groove and a signal from a land adjacent to the guide groove can be reproduced simultaneously and independently, so that information transfer rate can be improved.

We claim:

1. An optical disk device comprising:
   a light source for emitting light;
   focusing optics for radiating and focusing said light onto at least one region of an optical recording medium;
   a photo-detection system for photoelectrically transforming reflected light from said optical recording medium;
   a reproduction circuit for reproducing information recorded on said optical recording medium by using an electric signal from said photo-detection system;
   phase control optics for changing an optical phase of said reflected light;
   a readout control circuit for controlling a quantity of an optical phase change of said phase control optics;
   a learning control circuit for detecting a noise component from an output signal of said reproduction circuit while said readout control circuit varies the quantity of said optical phase change; and
   a memory for storing a value of the quantity of said optical phase change as an optimum value when said learning control circuit detects a minimum of the noise component.

2. An optical disk device according to claim 1, wherein said readout control circuit changes the quantity of said optical phase change of said phase control optics when a different region from the at least one region of the magneto-optical recording medium is reproduced.

3. An optical disk device according to claim 1, wherein said phase control optics has a first quarter wave plate, a half wave plate and a second quarter wave plate in a light path of said reflected light in order with respect to said reflected light, and has a mechanism for rotating said half wave plate around an optical axis of said reflected light.

4. An optical disk device according to claim 3, wherein a high-speed axis or a low-speed axis of said first quarter wave plate is made substantially coincident with a direction of polarization of said reflected light.

5. An optical disk device according claim 1, wherein said phase control optics has a first quarter wave plate and a second quarter wave plate in a light path of said reflected light in order with respect to said reflected light, and has a mechanism for rotating said first quarter wave plate, together with photo-detectors in said photo-detection system, around an optical axis of said reflected light.

6. An optical disk device according to claim 1, wherein said phase control optics has at least one high-order phase plate for said reflected light in a light path of said reflected light, and has a mechanism for rotating said high-order phase plate around a low-speed axis or a high-speed axis.

7. An optical disk device according to claim 1, wherein said optical recording medium is provided with learning regions and said learning control circuit detects a noise component from the output signal of said reproduction circuit while said light is focused onto at least one learning region of said optical recording medium.

8. An optical disk device according to claim 7, wherein said learning control circuit operates in a learning mode, and in a reproduction mode, said readout control circuit is responsive to said memory for controlling the quantity of said optical phase change in accordance with said optimum value stored in said memory.

9. An optical disk device according to claim 8, wherein said memory stores an optimum value for each of said learning regions and said optical recording medium has regions thereof corresponding to said learning regions.

10. An optical disk device according to claim 7, wherein said learning regions are provided with learning marks.

11. A magneto-optical reproducing method in which laser light is radiated and focused onto an optical recording medium, a change of a plane of polarization of light reflected from said optical recording medium is detected to form an electric signal, and information magnetically recorded on said optical recording medium is magneto-optically detected on the basis of said electric signal, said method comprising the steps of:

arranging phase control optics in a light path of said reflected light for changing an optical phase of said reflected light;

controlling a quantity of phase compensation of said phase control optics on the basis of said electric signal;

arranging learning regions discretely on said recording medium;

detecting a noise component from said electric signal while varying the quantity of the optical phase change during radiation of the laser light onto at least one learning region; and storing a value of the quantity of an optical phase change as an optimum value when a minimum noise component is detected for the at least one learning region.

12. A magneto-optical reproducing method according to claim 11, wherein reference marks are provided in said learning regions, and a change of the plane of polarization of said reflected light modulated by said reference marks is detected to form said electric signal.

13. A magneto-optical reproducing method according to claim 11, wherein said phase control optics is controlled on the basis of the stored optimum value.

14. A magneto-optical reproducing method according to claim 11, wherein an optical disk in which guide grooves and lands thereof are made to be an information storage region is used as said recording medium.

15. A magneto-optical reproducing method according to claim 11, wherein said learning regions include learning marks provided on said optical recording medium.

16. A magneto-optical reproducing method according to claim 11, wherein the noise component is detected during a learning mode, and in a reproduction mode, the quantity of the optical phase change is controlled in accordance with the stored optimum value.

17. A magneto-optical reproducing method according to claim 11, wherein an optimum value is stored for each of said learning regions, and said optical recording medium has regions corresponding to said learning regions.

* * * * *